United States Patent [19]

Sato

[11] Patent Number: 4,663,722

[45] Date of Patent: May 5, 1987

[54] AUTOMATIC PAPER FEED CONTROL APPARATUS FOR A PRINTING DEVICE

[75] Inventor: Masafumi Sato, Fuji, Japan

[73] Assignee: Tokyo Electric Co., Ltd., Tokyo, Japan

[21] Appl. No.: 672,097

[22] Filed: Nov. 15, 1984

[30] Foreign Application Priority Data

Nov. 26, 1983 [JP] Japan ........ 58-222845
Nov. 26, 1983 [JP] Japan ........ 58-222846

[51] Int. Cl.$^4$ ........ G06F 15/20; B41J 11/50; B65H 3/44

[52] U.S. Cl. ........ 364/478; 364/518; 400/605; 400/608.3; 271/9; 355/14 SH

[58] Field of Search ........ 364/478, 471, 518, 519, 364/523, 200, 900; 226/5, 10, 11, 101, 110; 271/9, 145; 400/605, 608.3, 608.1, 608.2, 624, 625, 608.4; 355/14 SH

[56] References Cited

U.S. PATENT DOCUMENTS

| | | | |
|---|---|---|---|
| 4,087,172 | 5/1978 | Van Dongen | 226/101 X |
| 4,234,261 | 11/1980 | Hendrischk | 400/608.3 X |
| 4,334,764 | 6/1982 | Rawson et al. | 226/10 X |
| 4,452,543 | 6/1984 | Adkisson et al. | 326/110 |
| 4,504,161 | 3/1985 | Volke et al. | 400/605 |
| 4,538,933 | 9/1985 | Imaizumi et al. | 364/518 |
| 4,540,297 | 9/1985 | Imaizumi | 400/605 X |
| 4,577,984 | 3/1986 | Yamamoto et al. | 400/605 X |
| 4,606,663 | 8/1986 | Christoph et al. | 400/605 |

FOREIGN PATENT DOCUMENTS

| | | | |
|---|---|---|---|
| 2717758 | 10/1978 | Fed. Rep. of Germany | 400/605 |

*Primary Examiner*—Joseph Ruggiero
*Assistant Examiner*—Jon D. Grossman
*Attorney, Agent, or Firm*—Frishauf, Holtz, Goodman & Woodward

[57] ABSTRACT

An automatic paper feed control apparatus includes a page feed command generator; a paper feeder, selectively coupled to a continuous paper feeder and an automatic paper feeder, for feeding a paper to a printing device from the coupled continuous paper feeder or automatic paper feeder; and a control circuit for controlling the operation of the paper feeder in response to a page feed command from the page feed command generator. The apparatus is further provided with a signal generator for generating a first or second signal indicative of the continuous paper feeder or automatic paper feeder used. The control circuit controls the paper feeder in response to the page feed command and the first signal, thereby allowing paper to be drawn out from the continuous paper feeder by only a predetermined length, and controls the paper feeder in response to the page feed command and the second signal, thereby allowing a new paper to be supplied to the printing device from the automatic paper feeder.

7 Claims, 6 Drawing Figures

AUTOMATIC PAPER FEED CONTROL APPARATUS FOR A PRINTING DEVICE

BACKGROUND OF THE INVENTION

The present invention relates to an automatic paper feed control apparatus for a printing device to which an automatic paper feeder for sequentially supplying a plurality of papers, and a continuous paper feeder for supplying a continuous paper, can be attached.

As a paper feed apparatus for supplying papers to a printing device, for example, there is known a continuous paper feeder for supplying to a platen of the printing device a paper which is wound in the form of a roll and in which perforations are formed at regular intervals. After the character data of one page is printed on the paper supplied by such continuous paper feeder, a one page paper is drawn out and printing onto the paper of the next page is prepared. As another paper feeder, there is known an automatic paper feeder in which a plurality of papers, each having a predetermined size, are preliminarily enclosed in a tray and they are sequentially fed by one sheet at a time to the platen of the printing device.

There has been conventionally provided a printing device which is constituted in a manner such that the papers are selectively received from the mentioned continuous paper feeder and automatic paper feeder and character data or the like is printed on the papers received.

In such a kind of printing device, for example, in case of printing the character data or the like on the paper supplied from the automatic paper feeder, a sheet of paper is first drawn out from a plurality of papers enclosed in the tray of the automatic paper feeder in response to a paper feed command which is generated from an external host computer, then the print starting portion of this paper is set on the platen so as to face a print hammer. Thereafter, the character data corresponding to the character codes from the host computer is sequentially printed on the paper. After the character data of one page is completely printed, a page feed command for a sheet of paper is supplied from the host computer, so that the platen is rotated in response to this page feed command, thereby discharging the paper after completion of the printing to the outside. When a paper feed command is supplied from the host computer after that, the next paper is drawn out in the similar manner as above and the printing is performed.

On the other hand, when printing character data on the paper supplied from the continuous paper feeder, the paper from the continuous paper feeder is drawn out in response to a paper feed command from the host computer and the print starting portion of a certain page section is set on the platen so as to face the print hammer. The initialization of this continuous paper may be manually executed. Thereafter, the character data corresponding to the character code from the host computer is sequentially printed on this page section. After the character data of one page is completely printed, a page feed command for the continuous paper is supplied from the host computer and the platen is rotated in response to this page feed command, thereby setting the paper into the position where the print starting portion of the next page section faces the printing hammer. Thereafter, the character data is printed on the next page section in a similar manner as above.

In the case where the automatic paper feeder is used, whenever the page is updated, it is necessary for the host computer to generate two kinds of different commands such as the paper feed command for allowing a paper to be drawn into the printing device from the tray of the automatic paper feeder, and the page feed command for allowing the printed paper to be drained. Thus, the program for the host computer becomes complicated and the amount of information to be transmitted between the host computer and the printing device increases, causing the information processing speed and information transmission efficiency of the host computer to be deteriorated.

In the case where the continuous paper feeder is used, the page feed command may be generated from the host computer in order to update the page. However, since it is necessary for the host computer to generate the different commands depending upon the type of continuous paper feeder or automatic paper feeder used, it is necessary to send to the host computer the information regarding which one of the continuous paper feeder and automatic paper feeder is used. Therefore, this causes the program for the host computer to be further complicated.

SUMMARY OF THE INVENTION

It is an object of the present invention to provide an automatic paper feed control apparatus for a printing device in which the page updating operation is executed in response to the same page feed command which is supplied from a host computer irrespective of which one of a continuous paper feeder and an automatic paper feeder is used.

This object is accomplished by an automatic paper feed control apparatus comprising: a paper feeder unit, selectively and drivingly coupled to a continuous paper feeder and automatic paper feeder, for feeding a paper to a printing device from the coupled continuous paper feeder or automatic paper feeder; a signal generator for selectively generating a first or second signal indicating which one of the continuous paper feeder and automatic paper feeder is coupled to the paper feeder unit; and a control circuit which gives a first control signal to the continuous paper feeder in response to a page feed code from a data generator and to the first signal from the signal generator to thereby allow the continuous paper to be drawn out by a predetermined length, and which gives a second control signal to the automatic paper feeder in response to the paper feed code and to the second signal to thereby allow the new paper to be supplied into the printing apparatus from the automatic paper feeder.

In this invention, the paper can be drawn out from the continuous paper feeder or automatic paper feeder designated by the first or second signal from the signal generator and can be fed into the printing apparatus in response to the page feed code from the code generator irrespective of which one of the continuous paper feeder and automatic paper feeder is used.

DETAILED DESCRIPTION OF THE PREFERRED EMBODIMENTS

Figure 1:
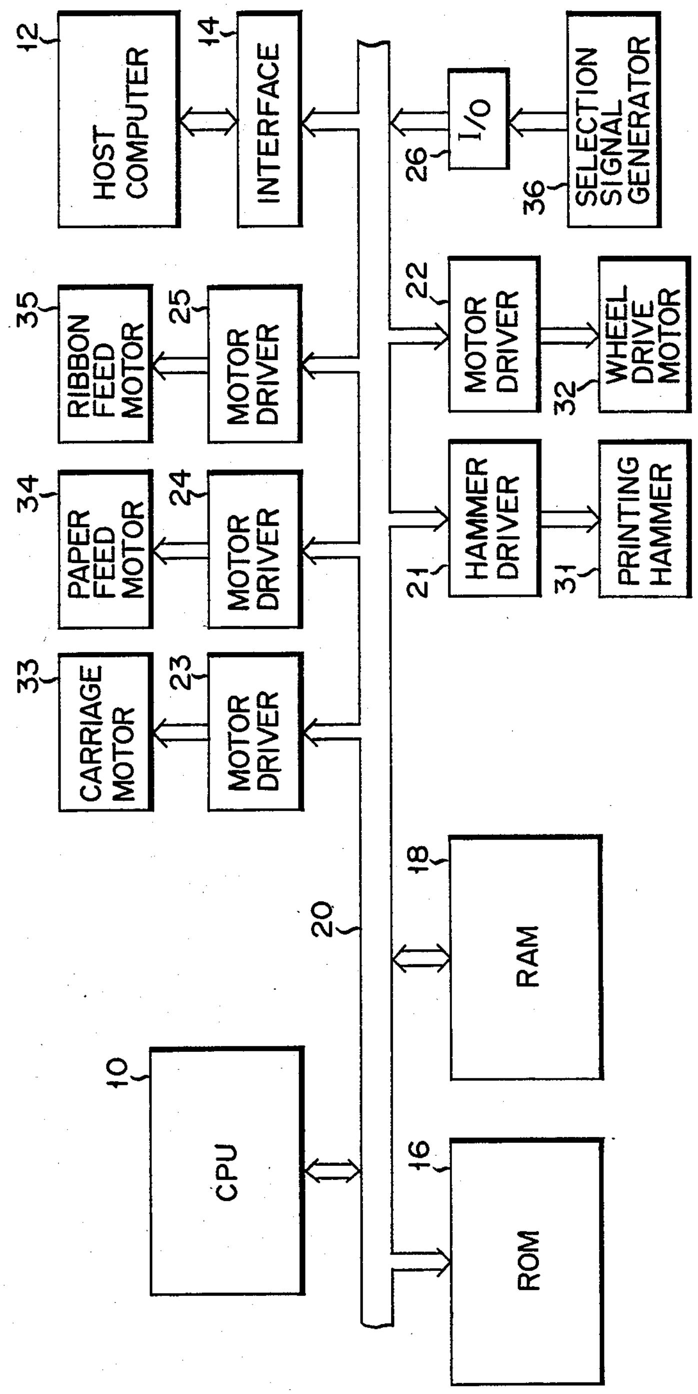
FIG. 1 is a block diagram showing a printing apparatus including an automatic paper feed control apparatus according to one embodiment of the present invention.

FIG. 1 shows a printing apparatus including an automatic paper feed control apparatus according to one embodiment of the present invention. This printing apparatus includes a CPU 10; a host computer 12 for supplying character codes corresponding to characters to be printed, to the CPU 10 through an interface 14; a read only memory (ROM) 16 in which a control program used in data processing by the CPU 10 is stored; and a random access memory (RAM) 18 for storing data such as character codes and the like which are supplied from the host computer 12 through an eight-bit data bus 20. Further, the CPU 10 is coupled to drivers 21 to 25 and an I/O port 26 through the data bus 20. A printing hammer 31, a printing wheel drive motor 32, a carriage motor 33, a paper feed motor 34, and a ribbon feed motor 35 are coupled to these drivers 21 to 25. A selection signal generator 36 is coupled to the I/O port 26.

Figure 2:
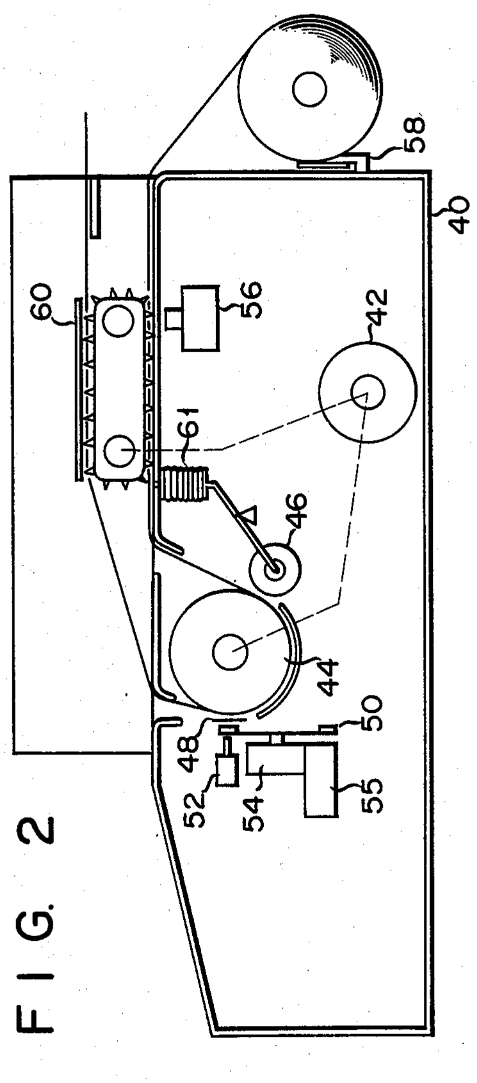
FIG. 2 illustrates a schematic mechanism of a printing device and a continuous paper feeder mounted on this printing device.
Figure 3:
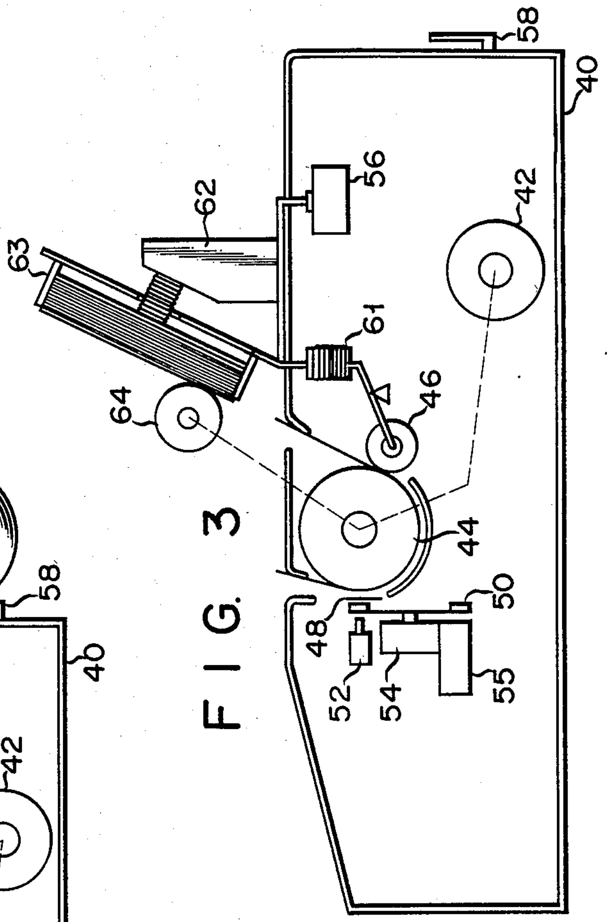
FIG. 3 illustrates a schematic mechanism of the printing device and an automatic paper feeder mounted on this printing device.

FIGS. 2 and 3 schematically illustrate mechanisms of the printing apparatus to which the continuous paper feeder and automatic paper feeder are attached, respectively. This printing apparatus includes: a housing 40; a paper feed motor 42 arranged in the housing 40; a platen 44 which is driven by the paper feed motor 42; an auxiliary roll 46; an ink ribbon 48, a printing wheel 50 and a printing hammer 52 which are arranged to face the platen 44; a wheel drive motor 54, provided on a carriage 55 which is moved along the platen 44, for driving the printing wheel 50; and a microswitch 56. Although the electronic control circuit shown in FIG. 1 is enclosed in the housing 40, this electronic control circuit is not shown in FIGS. 2 and 3 for simplicity of the drawings. Further, a roll paper attaching tool 58 for attaching the continuous paper roll is formed on the outside of the housing 40. The printing hammer 52, drive motor 54 and paper feed motor 42 in FIGS. 2 and 3 respectively correspond to the printing hammer 31, wheel drive motor 32 and paper feed motor 34 in FIG. 1. The switch 56 is included in the selection signal generator 36 in FIG. 1.

As shown in FIG. 2, in the case where the continuous paper feeder is used, a tractor or paper drawing device 60 is detachably mounted on the upper wall of the housing 40 and the paper roll is set to the attaching tool 58. After the paper from the paper roll is passed through the lower side of the tractor, it is led in the housing 40 and wound around the platen 44. Then, it is drawn out to the outside of the housing and is set so as to pass through the upper side of the tractor 60. The tractor 60 is coupled through a link mechanism to the paper feed motor 42 which is also coupled to the platen 44 through a link mechanism in order to drive the platen 44. In case of using the continuous paper feeder, a spring 61 is kept at an ordinary position and the auxiliary roll 46 is held at the position apart from the platen 44. The switch 56 is kept at the OFF position. Thus, the tractor 60 is driven in association with the rotation of the paper feed motor 42, so that the paper from the paper roll is sequentially supplied onto the platen 44 and the paper passed through the platen 44 is led to the outside through the tractor 60.

As shown in FIG. 3, in case of using the automatic paper feeder, a paper holder 62 having a tray 63 for enclosing a plurality of papers each having a predetermined size is mounted on the upper wall of the housing 40. This automatic paper feeder is further equipped with a paper feed roller 64 which comes into pressure contact with the papers enclosed in the tray 63 and is coupled to the platen 44 through a link mechanism including a one-way clutch (not shown). On the other hand, in the case where this automatic paper feeder is mounted onto the housing 40, two projections push up an actuator of the switch 56 and the spring 61 through through-holes formed in the housing 40. Thus, the switch 56 is set to the ON state and the roll 46 comes into contact with the platen 44.

In this embodiment, in the case where the platen 44 is forwardly driven by the motor 42, the rotational movement of the platen 44 is not transferred to the paper feed roller 64. When the platen 44 is reversely driven, the rotational movement of the platen 44 is transferred to the paper feed roller 64, so that a sheet of paper is drawn out from the tray 63.

Figure 4:
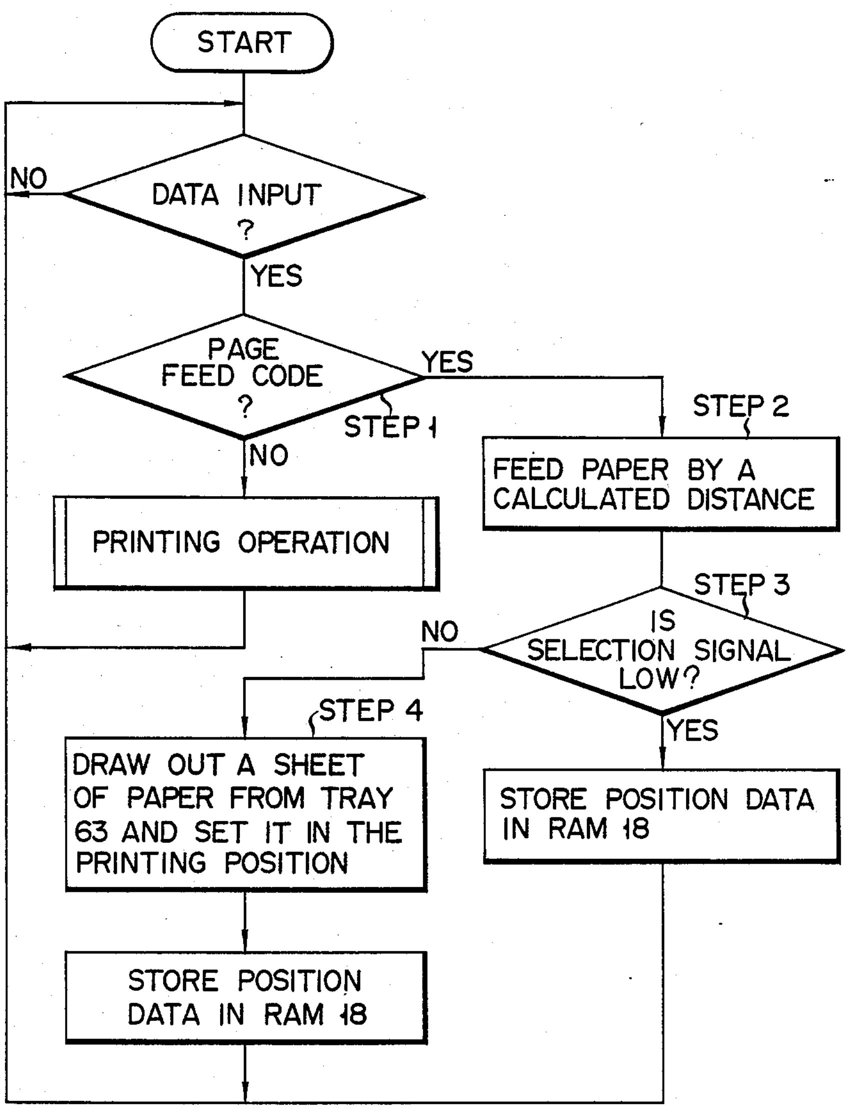
FIG. 4 is a flow chart for explaining the operation of the printing apparatus shown in FIGS. 1 to 3.

The operation of the printing apparatus shown in FIGS. 1 to 3 will now be described hereinbelow with reference to a flow chart shown in FIG. 4. For simplicity of explanation, in this embodiment, it is assumed that the host computer 12 supplies the character code and page feed code to the CPU 10 through the interface 14 and data bus 20.

When the CPU 10 detects that correct data is inputted from the host computer 12, a check is made to see if this input data is the page feed code or not in STEP 1. When it is determined that this input data is not the page feed code, namely, when the input data is determined to be the character code, the CPU 10 allows the printing operation to be executed in accordance with this input character code. That is, the CPU 10 allows the angle position data of the printing wheel 50 corresponding to the input character code to be stored into the RAM 18; calculates a rotational angle through which the printing wheel 50 should be rotated on the basis of the angle position data which is newly stored and of the angle position data which indicates the present position of the printing wheel 50 and has been previously stored into the RAM 18; and permits this rotational angle data to be stored into the RAM 18. The CPU 10 supplies a drive signal corresponding to the rotational angle data stored in the RAM 18 to the motor driver 22, thereby rotating the printing wheel 50 by the corresponding angle and setting the type which is designated by the input character code to the printing position. At this time, the CPU 10 gives a drive signal to the motor driver 23, thereby rotating the carriage motor 33 and moving the carriage 55 to the printing position, at the same time it gives a drive signal to the motor driver 25, thereby rotating the ribbon feed motor 35 to feed the ribbon 48 by a predetermined distance. Thereafter, the CPU 10 gives a drive signal to the hammer driver 21, thereby driving the printing hammer 31 to hit the type which was set in the printing position. Thus, the character corresponding to the input character code is printed on the paper. In this way, the printing operation with regard to the input character code is completely performed.

Subsequently, in the same manner as above, the printing operation is executed whenever the character code is inputted and, after the character codes of one page are completely sent, the host computer 12 supplies the page feed code to the CPU 10 through the interface 14 and data bus 20. When it is detected in STEP 1 that the input data is the page feed code, the CPU 10 drives the paper feed motor 34 in STEP 2, thereby feeding the paper after completion of the printing by a preset distance from the printable end position or final end of this paper. In the case where this paper is a sheet of paper supplied from the automatic paper feeder, after this paper is fed by the calculated distance in STEP 2, the paper is discharged to the outside from the printing apparatus. On the other hand, in the case where the paper is a continuous paper supplied from the continuous paper feeder, when this paper is fed by the predetermined distance from the printable end position of this printed page or from the final end of this page in STEP 2, the print starting area of the next page will be set to the position corresponding to the printing hammer 52. For instance, this STEP 2 is executed in such a manner that: a distance data D1 indicative of the distance of one page and a position data PSP representative of the print starting position of the paper which should be printed are stored into the RAM 18; a distance data D2 between the print starting position and the print end position is calculated on the basis of a position data PEP indicating the print end position and of the above-mentioned position data PSP; the paper feed motor 34 is rotated by an angle determined by the difference between these distance data D1 and D2 to feed the paper by a corresponding distance from the print end position.

After the processing in STEP 2 is carried out, in STEP 3, the CPU 10 checks to see if a selection signal from the selection signal generator 36 is at a low or high level, that is, if the continuous paper feeder is used and the switch 56 is turned off or the automatic paper feeder is used and the switch 56 is turned on. When it is detected that the selection signal is low, namely, that the continuous paper feeder is used, the CPU 10 determines the present position of the paper as the print starting position and allows the print starting position data to be stored into a predetermined memory area of the RAM 18. Thereafter, the CPU 10 waits until the data is supplied from the host computer 12. On the other hand, when the selection signal is detected to be high in STEP 3, namely, when it is detected that the automatic paper feeder is used, in STEP 4, the CPU 10 gives a drive signal to the motor driver 24, thereby reversely rotating the paper feed motor 34. The reverse rotation of the paper feed motor 34 is transferred to the platen 44 and then to the paper feed roller 64 in the automatic paper feeder. Due to this, a sheet of paper in the tray 63 is drawn out and is led through a paper receiving inlet to the position where the paper comes into contact with the platen 44. Thereafter, the CPU 10 allows the paper feed motor 34 to be forwardly rotated by only a predetermined angle to rotate the platen 44, thereby setting the paper on the platen so that the print starting area of the paper comes to the position where it faces the printing hammer 52. Further, the CPU 10 determines the present position of the paper as the print starting position and allows the print starting data to be stored into a predetermined counter memory area in the RAM 18. The content of this counter memory area is increased by one count whenever, for instance, the printing progresses by one line. Thereafter, the CPU 10 waits until the next data is inputted from the host computer 12.

In this embodiment, the host computer 12 supplies the page feed code after the character code is sent; however, the paper on which the printing is first performed may be manually set to the printing position. Or, the paper may be set to the printing position by allowing the page feed code to be generated from the host computer 12 before the first character code is generated.

As described above, in this embodiment, the same page feed code is generated from the host computer 12 when the page is updated irrespective of which one of the continuous paper feeder and automatic paper feeder is used, and there is no need to send the paper feed command; therefore, it is possible to reduce the amount of information which should be processed by the host computer 12.

Figure 5:
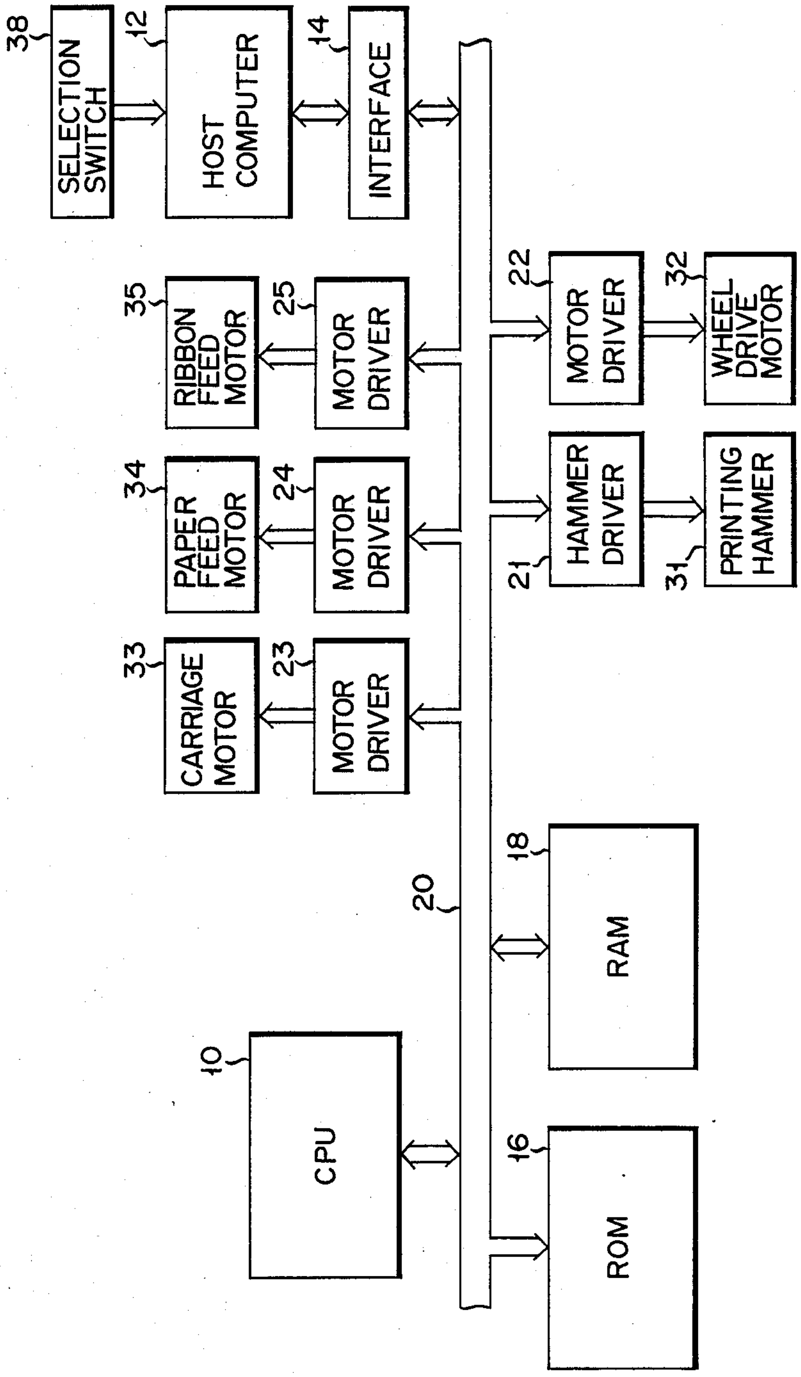
FIG. 5 is a block diagram showing a printing apparatus including an automatic paper feed control apparatus according to another embodiment of the invention.

FIG. 5 shows a printing apparatus including an automatic paper feed control apparatus according to another embodiment of the invention. This printing apparatus is constituted substantially similarly to that shown in FIG. 1 except that the I/O port 26 and selection signal generator 36 are omitted and that, in place of them, a selection switch 38 coupled to the host computer 12 is used. The selection switch 38 is, for instance, manually set to a first or second switching position in dependence upon the use of the continuous paper feeder or automatic paper feeder. In this embodiment, for simplicity of explanation, it is assumed that the host computer 12 generates an escape character code ESC·X indicative of the paper feed command, an escape character code ESC·Y representing that the selection switch 38 is set to the first switching state to use the continuous paper feeder, a page feed code, and a printing character code.

Figure 6:
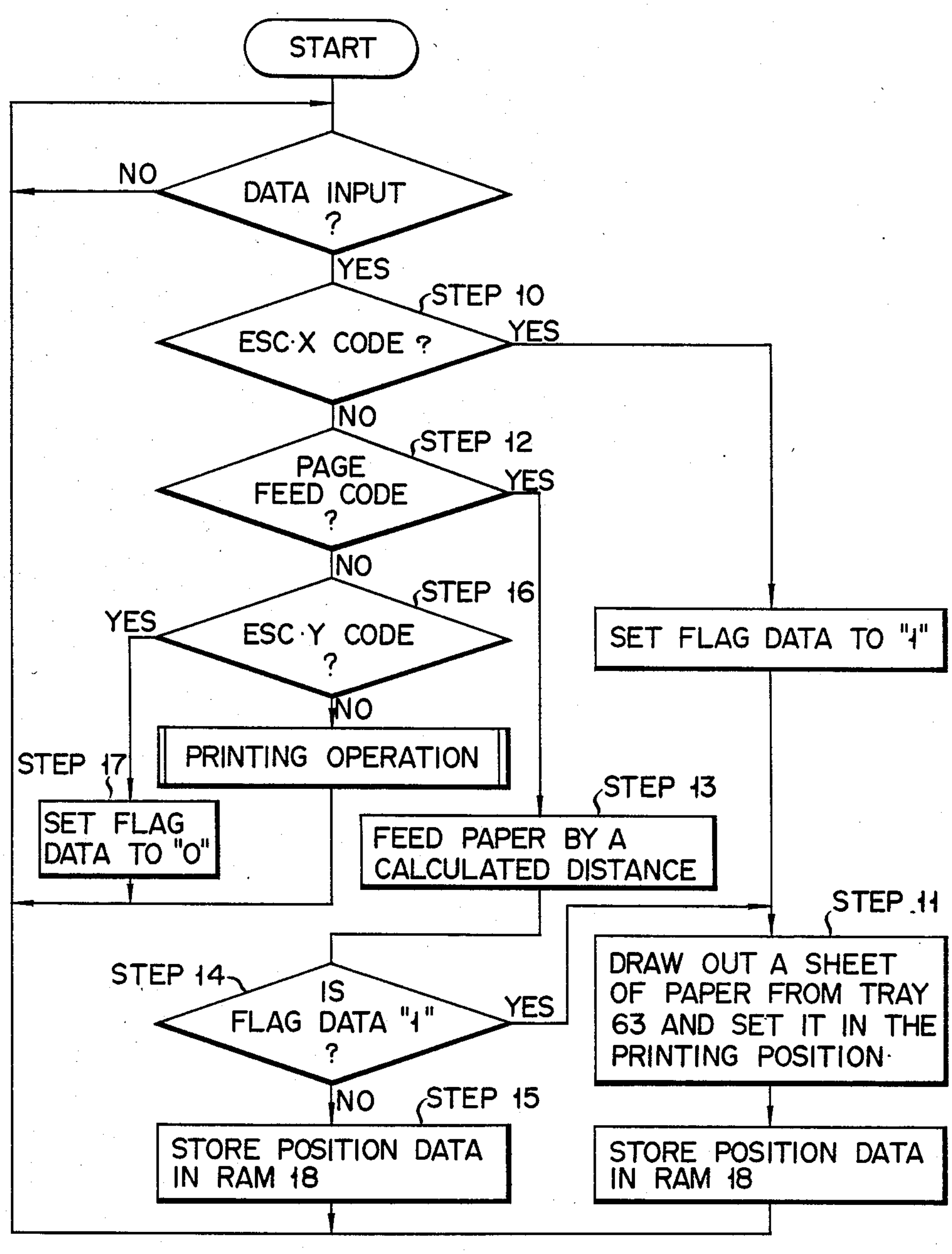
FIG. 6 is a flow chart for explaining the operation of the printing apparatus shown in FIG. 5.

FIG. 6 shows a flow chart for explaining the operation of the printing apparatus shown in FIG. 5.

When it is detected that correct data is inputted from the host computer 12, in STEP 10, the CPU 10 checks to see if this input data is the ESC·X code or not. This ESC·X code is generated in order to draw out the first paper from the automatic paper feeder and set it to the printing position when the selection switch 38 is set to the second switching position. In the case where it is detected that this input data is the ESC·X code, the CPU 10 allows a flag data F1 of "1" to be stored into the flag memory area in the RAM 18. Thereafter, the CPU 10 permits a sheet of paper to be drawn out from the tray 63 of the automatic paper feeder in STEP 11 in a similar manner as in STEP 4 in FIG. 4, thereby setting the paper onto the platen 44 so that the paper comes to the position facing the printing hammer 52. After that, the CPU 10 determines the present position of the paper as the print starting position and allows the print starting data to be stored into the counter memory area in the RAM 18. Further thereafter, the CPU 10 waits until the next data is inputted from the host computer 12.

On the other hand, when it is detected in STEP 10 that the input data is not the ESC·X code, the CPU 10 checks to see if this input data is the page feed code or not in STEP 12. When it is detected that the input data is the page feed code, in STEP 13, the CPU 10 allows a sheet of paper to be discharged to the outside from the printing apparatus or permits the continuous paper to be fed until the print starting area of the next page of the continuous paper comes to the position facing the printing hammer 52, in a similar manner as in STEP 2 in FIG. 4. After the end of STEP 13, the CPU 10 checks to see if the flag data stored into the flag memory area in the RAM 18 is "1" or not in STEP 14. When it is detected that the flag data is "1", namely, that the automatic paper feeder is used, STEP 11 is executed. On the other hand, when it is detected that the flag data is "0" in STEP 14, that is, when it is detected that the continuous paper feeder is used, the CPU 10 determines that the present position of the paper is the print starting position in STEP 15 and allows the print starting data to be stored into the counter memory area in the RAM 18. Thereafter, the CPU 10 waits until the next data is inputted from the host computer 12.

In STEP 12, when it is detected that the input data is not the page feed code, the CPU 10 checks to see if the input data is the ESC·Y code or not in STEP 16. This ESC·Y code is generated before the character data is printed in the first page and after the selection switch 38 was set to the first switching state. When it is detected that the input data is the ESC·Y code, the CPU 10 allows the flag data of "0" to be written into the flag memory area in the RAM 18 in STEP 17. Thereafter, the CPU 10 waits until the next data is inputted from the host computer 12. On the other hand, when it is detected in STEP 16 that the input data is not the ESC·Y code, namely, when it is detected that the input data is the printing character code, the CPU 10 allows the character data corresponding to this character code to be printed similarly to the printing operation in FIG. 4, and then waits until the next data is inputted from the host computer 12.

In this embodiment, in the case where the selection switch 38 is set to the first switching position and the printing is performed on the paper from the continuous paper feeder, the CPU 10 executes the processings in STEPs 10, 12, 16, and 17 in the first cycle and then carries out the processings in STEPs 10, 12 and 16 and the printing operation in the subsequent cycle. The printing of one page ends in this way and the processings in STEPs 10, 12, 13, 14, and 15 are performed in response to the page feed code from the host computer 12, and then the page is updated. Thereafter, for example, the continuous paper is removed from the platen and the automatic paper feeder is set to the printing device and the selection switch 38 is simultaneously set to the second switching position. At this time, the CPU 10 executes STEPs 10 and 11 in response to the ESC·X code from the host computer 12. The CPU 10 executes STEPs 10, 12 and 16 and the printing operation in the subsequent cycle. After the printing of one page is ended in this way, the CPU 10 then sequentially executes STEPs 10, 12, 13, 14, and 11 and allows the previous paper to be discharged and sets the next paper to the printing position.

In this embodiment as well, an effect similar to the foregoing embodiment is obtained. Further in this embodiment, in case of switching from the automatic paper feeder to the continuous paper feeder, or in the opposite case, the ESC·Y code or ESC·X code is generated from the host computer 12 only once. Therefore, an undesirable increase in amount of information which is processed by the host computer 12 is prevented. In addition, the switching command for these paper feeders is generated by changing the switching state of the selection switch 38, so that it is unnecessary to change the program for the host computer 12.

What is claimed is:

1. An automatic paper feed control apparatus for use in a printing device for printing a character corresponding to an input character code, comprising:

data generating means for generating a page feed code;

paper feeder means, selectively and drivingly coupled to a continuous paper feeder or an automatic paper feeder, for feeding a paper from said coupled continuous paper feeder or automatic paper feeder to the printing device;

signal generating means for selectively generating a first or a second signal indicating whether said continuous paper feeder or said automatic paper feeder is coupled to said paper feeder means; and a control circuit which gives a first control signal to said paper feeder means in response to the page feed code from said data generating means and to the first signal from said signal generating means, for allowing the continuous paper to be drawn out from the continuous paper feeder by a predetermined length, and which gives a second control signal to the paper feeder means in response to said page feed command and to said second signal, for allowing a paper printed in a preceding cycle to be discharged from said printing device and a new paper to be supplied to said printing device from the automatic paper feeder.

2. An automatic paper feed control apparatus according to claim 1, wherein said signal generating means is provided with switching means which is turned on when one of said continuous paper feeder and automatic paper feeder is mounted on said printing device, and which is turned off when said one of said paper feeders is removed from the printing device, and said signal generating means generates a signal of a level corresponding to the switching position of said switching means.

3. An automatic paper feed control apparatus according to claim 1, wherein said signal generating means is provided with switching means and a memory for storing data corresponding to a switching position of said switching means.

4. An automatic paper feed control apparatus according to claim 1, wherein said signal generating means includes switching means and a memory for storing data corresponding to a switching position of said switching means, and wherein said data generating means generates a first command code when it is detected that said switching means is at a first switdhing poistion, and said control circuit writes a first data into said memory in response to said first command code and allows a sheet of paper to be drawn out from said automatic paper feeder and sets the paper sheet to a printing position of said printing device.

5. An automatic paper feed control apparatus according to claim 1, wherein said signal generating means includes switching means and a memory for storing data corresponding to a switching position of said switching means, and wherein said data generating means selectively generates a first or a second command code when it is detected that said switching means is at a first or a second switching position, and said control circuit writes a first data into said memory in response to said first command code and allows a sheet of paper to be drawn out from said automatic paper feeder and sets the paper sheet to a printing position of said printing device, and writes a second data into said memory in response to said second command code.

6. An automatic paper feed control apparatus for use in a printing device for printing a character corresponding to an input character code, comprising:

paper feeder means, selectively and drivingly coupled to a continuous paper feeder or an automatic paper feeder, for feeding a paper from said coupled continuous paper feeder or automatic paper feeder to the printing device;

signal generating means for selectively generating a first or a second signal indicating whether said continuous paper feeder or said automatic paper feeder is coupled to said paper feeder means; and a control circuit which gives a first control signal to said paper feeder means in response to the page feed code from data generating means and the first signal from said signal generating means, for allowing the continuous paper to be drawn out from the continuous paper feeder by a predetermined length, and which gives a second control signal to the paper feeder means in response to said page feed code and said second signal, for allowing a paper printed in a preceding cycle to be discharged from said printing device and a new paper to be supplied to said printing device from the automatic paper feeder.

7. An automatic paper feed control apparatus according to claim 6, wherein said signal generating means is provided with switching means which is turned on when one of said continuous paper feeder and automatic paper feeder is mounted on said printing device and which is turned off when said one of said paper feeders is removed from the printing device, and said signal generating means generates a signal of a level corresponding to the switching position of said switching means.

* * * * *